United States Patent
Yamahira et al.

(10) Patent No.: US 11,555,781 B2
(45) Date of Patent: Jan. 17, 2023

(54) FINE RATIO MEASURING DEVICE, FINE RATIO MEASURING SYSTEM, AND BLAST FURNACE OPERATING METHOD

(71) Applicant: JFE Steel Corporation, Tokyo (JP)

(72) Inventors: Naoshi Yamahira, Tokyo (JP); Toshiki Tsuboi, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 183 days.

(21) Appl. No.: 17/043,851

(22) PCT Filed: Mar. 26, 2019

(86) PCT No.: PCT/JP2019/013016
§ 371 (c)(1),
(2) Date: Sep. 30, 2020

(87) PCT Pub. No.: WO2019/189262
PCT Pub. Date: Oct. 3, 2019

(65) Prior Publication Data
US 2021/0048386 A1    Feb. 18, 2021

(30) Foreign Application Priority Data

Mar. 30, 2018    (JP) .............................. JP2018-067011

(51) Int. Cl.
*G01N 21/31*    (2006.01)
*G01N 21/27*    (2006.01)
(Continued)

(52) U.S. Cl.
CPC ............. *G01N 21/31* (2013.01); *G01N 21/27* (2013.01); *G01N 2021/845* (2013.01); *G01N 2021/8592* (2013.01)

(58) Field of Classification Search
CPC ........... G01N 15/02; G01N 2021/4769; G01N 2021/845; G01N 2021/8592; G01N 21/27;
(Continued)

(56) References Cited

U.S. PATENT DOCUMENTS 4,799,799 A    1/1989 Sapko et al.
10,281,406 B1 *    5/2019 Russo .................... G01J 3/443
(Continued)

FOREIGN PATENT DOCUMENTS

CA    2 893 161    11/2016
EP    3214429 A1    9/2017
(Continued)

OTHER PUBLICATIONS

Grant of Patent dated May 17, 2022, of counterpart Korean Patent Application No. 10-2020-7028139, along with an English translation.
(Continued)

*Primary Examiner* — Hina F Ayub
(74) *Attorney, Agent, or Firm* — DLA Piper LLP (US)

(57) ABSTRACT

A fine ratio measuring device that measures a ratio of fines adhering to the surface of a material in the form of lumps, the fine ratio measuring device includes: an illumination unit that illuminates the material in the form of lumps; a spectrometer that performs spectral analysis on light reflected from the material in the form of lumps to measure spectral reflectance; and an arithmetic device that extracts at least one feature quantity from the spectral reflectance measured by the spectrometer and computes the fine ratio from the extracted at least one feature quantity.

13 Claims, 5 Drawing Sheets

(51) Int. Cl.
*G01N 21/84* (2006.01)
*G01N 21/85* (2006.01)

(58) Field of Classification Search
CPC . G01N 21/31; G01N 21/85; G01N 2201/1293
See application file for complete search history.

(56) References Cited

U.S. PATENT DOCUMENTS

| | | | |
|---|---|---|---|
| 2005/0037505 A1* | 2/2005 | Samsoondar | G01N 33/72 |
| | | | 436/80 |
| 2010/0027006 A1 | 2/2010 | Hertens et al. | |
| 2011/0260073 A1* | 10/2011 | Duran | G01N 33/24 |
| | | | 250/435 |
| 2017/0212056 A1* | 7/2017 | Graehlert | G01B 11/0625 |
| 2019/0323889 A1* | 10/2019 | Sano | G01J 3/28 |
| 2020/0116642 A1* | 4/2020 | Zabrodin | G01J 3/443 |

FOREIGN PATENT DOCUMENTS

| | | |
|---|---|---|
| JP | H02-205606 A | 8/1990 |
| JP | 2000-329683 | 11/2000 |
| JP | 2001-91484 | 4/2001 |
| JP | 2001-116689 A | 4/2001 |
| JP | 2005-134301 | 5/2005 |
| JP | 2015-124436 | 7/2015 |
| JP | 2015-196888 | 11/2015 |
| JP | 2016-141828 | 8/2016 |
| KR | 10-2013-0110597 A | 10/2013 |
| KR | 10-2017-0036719 A | 4/2017 |
| RU | 816258 | 12/1992 |
| SU | 1642325 | 4/1991 |

OTHER PUBLICATIONS

Extended European Search Report dated Mar. 31, 2021, of counterpart European Application No. 19 777 912.7.
Office Action dated Mar. 31, 2021, of counterpart Russian Application No. 2020132203, with English translation.
Second Office Action dated Jan. 12, 2021, of counterpart Japanese Application No. 2019-535967, along with a Concise Statement of Relevance of Office Action in English.
"Adhesive force and internal friction coefficient of powdered coal and coal ash", *Journal of Powder Engineering*, vol. 18, No. 6, Jun. 10, 1981, pp. 429-434.
"Influence of coal rank on interparticle adhesion force", *54th Coal Science Conference*, Oct. 11, 2017, pp. 36-37.
Notice of Reasons for Refusal dated Jun. 30, 2020, of counterpart Japanese Application No. 2019-535967, along with a Concise Statement of Relevance of Office Action in English.
The Notification of Reason for Refusal dated Sep. 17, 2021, of counterpart Korean Application No. 10-2020-7028139, along with an English Translation and a Concise Statement of Relevance of Office Action in English.
Office Action dated Sep. 28, 2021, of counterpart Japanese Patent Application No. 2019-535967, along with a Concise Statement of Relevance of Office Action in English.
Office Action dated Jul. 12, 2022, of counterpart Japanese Patent Application No. 2019-535967, along with a Concise Statement of Relevance of Office Action in English.

* cited by examiner

FINE RATIO MEASURING DEVICE, FINE RATIO MEASURING SYSTEM, AND BLAST FURNACE OPERATING METHOD

TECHNICAL FIELD

This disclosure relates to a fine ratio measuring device and a fine ratio measuring system for raw materials used for blast furnaces and the like and to a blast furnace operating method that uses the fine ratio measuring system.

BACKGROUND

In production facilities such as blast furnaces that use raw materials such as minerals, the particle sizes of the raw materials affect the operations of production processes. Therefore, to stabilize the production processes, it is necessary to obtain the information about the particle sizes of the raw materials in advance. In a production process in a blast furnace, it is important to know the particle sizes of raw materials such as, in particular, coke, iron ore, and sintered ore, and it is also necessary to operate the blast furnace with attention to the ratios of fine-grained fines adhering to the raw materials to be charged into the blast furnace to ensure gas permeability in the furnace. The fine ratio is the ratio of the mass of fines to the total mass of the charged materials.

To maintain gas permeability in the blast furnace, it is important to provide spaces formed between lumps of the raw materials. When the raw materials contain a large amount of small lumps and fines, the spaces formed between the lumps of the raw materials are filled with the small lumps and fines, and the gas permeability deteriorates. Therefore, the raw materials to be charged are sieved in advance, and only the lumps on the sieve are charged into the blast furnace. Generally, by performing sieving before charging the raw materials into the blast furnace, the particle size of coke is often adjusted to 25 to 35 mm or more, and the particle size of iron ore or sintered ore is often adjusted to 5 to 25 mm or more. It is however difficult to completely remove the fines by a general sieving operation. In particular, fines adhering to lumps of the raw materials are charged together with the lumps into the blast furnace, and the lumps and the fines are separated in the blast furnace so that the gas permeability in the blast furnace deteriorates. Therefore, there is a need to know the amount of fines adhering to the lumps of the raw materials in advance to control the amount of fines charged into the blast furnace.

The particle sizes of raw materials charged into a blast furnace and their fine ratios are conventionally measured by periodic sampling of the raw materials and sieve analysis. However, since the sieve analysis is time consuming, it is difficult to reflect the results of the sieve analysis on the operation of the blast furnace in real time. This has led to the desire for a technique to obtain the particle size distribution of the raw materials conveyed to the blast furnace in real time. In a device disclosed in Japanese Unexamined Patent Application Publication No. 2005-134301, a raw material on a conveyor that conveys the raw material is sampled. The sample is automatically sieved using, for example, a robot, and the distribution of the particle size is measured.

Devices capable of measuring the particle size of a raw material in real time using, for example, a camera have been disclosed. Japanese Unexamined Patent Application Publication No. 2000-329683 discloses a method of detecting the particle size of a bulk raw material conveyed on a conveyor by capturing an image of the bulk raw material on the conveyor to produce image data, determining the distribution of brightness from the image data, and detecting the particle size of the bulk raw material using the maximum peak height in the brightness distribution. Japanese Unexamined Patent Application Publication No. 2015-124436 discloses a device that detects a material to be charged into a blast furnace. In that detection device, the water content of the material to be charged is detected from spectroscopic information obtained from reflected light in the near infrared range that is included in light reflected from the material to be charged into the blast furnace. The detection device detects the fine ratio in the material to be charged in real time by obtaining the relation between the water content of the material to be charged and the ratio of fines adhering to the material to be charged.

However, a problem with the device disclosed in Japanese Unexamined Patent Application Publication No. 2005-134301 is that, when the frequency of sampling is excessively high, the operation process is delayed. Since the inspection is sampling inspection, there is a problem of sampling representativeness.

In the method disclosed in Japanese Unexamined Patent Application Publication No. 2000-329683, a plurality of sets of data about the maximum peak height in a brightness distribution measured for a bulk raw material with a known particle size are prepared in advance for different particle sizes. The particle size of a bulk raw material is detected by comparing the maximum peak height in a brightness distribution computed from measured image data to the maximum peak height prepared in advance. That method does not quantitatively measure the ratio of fines. It is not stated that the ratio of fines adhering to a material in the form of lumps can be measured. Therefore, a problem with the method disclosed in Japanese Unexamined Patent Application Publication No. 2000-329683 is that the ratio of fines adhering to the surface of a material in the form of lumps cannot be measured quantitatively.

The device that detects a material to be charged that is disclosed in Japanese Unexamined Patent Application Publication No. 2015-124436 detects the water content of the material to be charged from the spectroscopic information about near infrared radiation, and the fine ratio in the material to be charged is detected from the relation between the water content of the material to be charged and the fine ratio in the material to be charged. However, the correlation between the water content of the material to be charged and the fine ratio in the material to be charged is not high, and a problem with that device is that the accuracy of the measurement of the fine ratio is low.

It could therefore be helpful to provide a fine ratio measuring device and a fine ratio measuring system that can accurately measure in real time the ratio of fines adhering to the surface of a material in the form of lumps used as a raw material for an operation process in, for example, a blast furnace and to provide a blast furnace operating method that uses the fine ratio measuring system.

SUMMARY

We thus provide:

(1) A fine ratio measuring device that measures the ratio of fines adhering to the surface of a material in the form of lumps, the fine ratio measuring device including: an illumination unit that illuminates the material in the form of lumps; a spectrometer that performs spectral analysis on light reflected from the material in the form of lumps to measure spectral reflectance; and an arithmetic device that extracts at least one feature quantity from the spectral reflectance measured by the spectrometer and computes the fine ratio from the extracted at least one feature quantity.

(2) The fine ratio measuring device according to (1), wherein the at least one feature quantity is at least one score of at least one basis vector of at least one predetermined principal component obtained by subjecting spectral reflectances at a plurality of wavelengths to principal component analysis, the spectral reflectances being measured by the spectrometer, wherein the arithmetic device includes an arithmetic unit and a storage unit, wherein a relational expression between the fine ratio and the at least one score is prestored in the storage unit, and wherein the arithmetic unit computes the at least one score from the spectral reflectances at the plurality of wavelengths and then computes the fine ratio using the computed at least one score and the relational expression.

(3) The fine ratio measuring device according to (1), wherein the at least one feature quantity is at least one score of at least one basis vector obtained by applying PLS to spectral reflectances at a plurality of wavelengths, the spectral reflectances being measured by the spectrometer, wherein the arithmetic device includes an arithmetic unit and a storage unit, wherein a relational expression between the fine ratio and the at least one score is prestored in the storage unit, and wherein the arithmetic unit computes the at least one score from the spectral reflectances at the plurality of wavelengths and then computes the fine ratio using the computed at least one score and the relational expression.

(4) The fine ratio measuring device according to (1), wherein the at least one feature quantity is at least one spectral reflectance at the at least one predetermined wavelength, the at least one spectral reflectance being measured by the spectrometer, wherein the arithmetic device includes an arithmetic unit and a storage unit, wherein a relational expression between the fine ratio and the at least one spectral reflectance at the at least one wavelength is prestored in the storage unit, and wherein the arithmetic unit computes the fine ratio using the at least one spectral reflectance at the at least one wavelength and the relational expression.

(5) A fine ratio measuring system including: the fine ratio measuring device according to any one of (1) to (4); and a conveyor that conveys the material in the form of lumps, wherein the fine ratio measuring device is disposed above the conveyor and measures the ratio of fines adhering to the surface of the material in the form of lumps that is to be conveyed to a blast furnace by the conveyor.

(6) A blast furnace operating method including the steps of: measuring, using the fine ratio measuring system according to (5), the ratio of the fines adhering to the surface of the material in the form of lumps that is to be conveyed to the blast furnace by the conveyor; and judging whether or not the measured fine ratio is higher than a predetermined threshold value, wherein, when the fine ratio is judged to be higher than the predetermined threshold value in the step of judging, the material in the form of lumps is sieved using a sieve having a mesh size larger than the particle size of the fines and smaller than the particle size of the material in the form of lumps.

With the fine ratio measuring device and the fine ratio measuring system, the ratio of fines adhering to the surface of a material in the form of lumps can be measured in real time with high accuracy. By measuring the fine ratio of, for example, coke that is a raw material to be charged into a blast furnace using the fine ratio measuring device and the fine ratio measuring system to control the amount of the coke fines charged into the blast furnace, the operation of the blast furnace can be stabilized.

BRIEF DESCRIPTION OF THE DRAWINGS

REFERENCE SIGNS LIST 10 fine ratio measuring system
12 fine ratio measuring device
14 conveyor
16 spectrometer
18 illumination unit
20 arithmetic device
22 arithmetic unit
24 storage unit
26 coke
28 hopper
30 sieve Detailed Description Our devices, systems and methods will be described using an example in which the fine ratio measuring device is used to measure the fine ratio of coke used as a raw material to be charged into a blast furnace.

Figure 1:
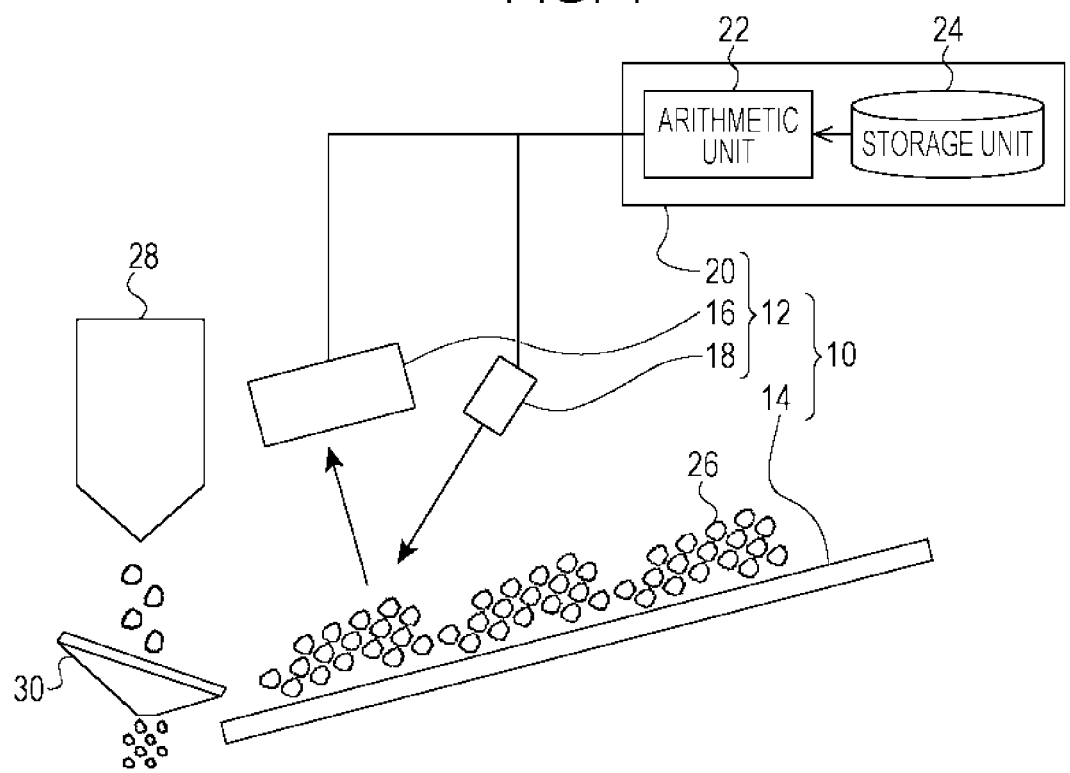
FIG. 1 is a schematic illustration showing a fine ratio measuring system including a fine ratio measuring device according to an example and an example of a peripheral structure of the fine ratio measuring system.

The fine ratio measuring system 10 includes the fine ratio measuring device 12 and a conveyor 14. Coke 26 to be charged into a blast furnace is stored in a hopper 28. The coke 26 discharged from the hopper 28 is sieved with a sieve 30 to screen out small particles with a particle size smaller than the sieve mesh size of the sieve 30, and the resulting coke 26 is conveyed to the blast furnace (not shown) by the conveyor 14.

In this example, the mesh size of the sieve 30 is 35 mm. Therefore, the coke 26 conveyed by the conveyor 14 contains lump coke with a particle size of 35 mm or more and coke fines adhering to the lump coke not sieved through the sieve 30. The particle size of the coke fines adhering to the lump coke was measured, and the coke fines were found to have a particle size of 1 mm or less. The coke fines mean coke fines that can pass through a sieve with a mesh size of 1 mm and have a particle size of 1 mm or less, and the lump coke means coke that remains on a sieve with a mesh size of 35 mm after sieving and has a particle size of 35 mm or more. In the example shown in FIG. 1, the coke 26 is an example of a material in the form of lumps.

The fine ratio measuring device 12 measures the fine ratio of the coke 26 conveyed on the conveyor 14. The fine ratio measuring device 12 includes an illumination unit 18, a spectrometer 16, and an arithmetic device 20. The illumination unit 18 is disposed above the conveyor 14 and illuminates the coke 26 conveyed by the conveyor 14. The spectrometer 16 is disposed above the conveyor 14 and performs spectral analysis on light reflected from the coke 26 on the conveyor 14 to measure spectral reflectances. As described above, the coke 26 contains the lump coke and the coke fines adhering to the surface of the lump coke. The spectral reflectances measured by the spectrometer 16 are affected not only by the lump coke, but also by the coke fines adhering to the surface of the lump coke. Therefore, the spectral reflectances measured by the spectrometer 16 also contain the information about the coke fines adhering to the lump coke.

The spectrometer 16 is placed at a height determined by the specifications of the device. In consideration of contact with the coke 26 conveyed on the conveyor 14, the height at which the spectrometer 16 is placed is preferably 300 mm to 1000 mm. In this manner, even when the amount of the coke conveyed by the conveyor 14 increases temporarily, the contact between the coke and the spectrometer 16 can be prevented.

The arithmetic device 20 is a general-purpose computer such as a workstation or a personal computer including an arithmetic unit 22 and a storage unit 24. The arithmetic unit 22 is, for example, a CPU and controls the operation of the illumination unit 18 and the operation of the spectrometer 16 using programs and data stored in the storage unit 24. The arithmetic unit 22 extracts feature quantities from spectral reflectances obtained by the spectrometer 16 and computes the ratio of coke fines adhering to lump coke using the extracted feature quantities. Programs for controlling the illumination unit 18 and the spectrometer 16, programs for performing computations in the arithmetic unit 22, arithmetic and mathematical expressions used during execution of the programs or the like are prestored in the storage unit 24.

The spectrometer 16 is controlled by the arithmetic unit 22 and performs spectral analysis on light reflected from the coke 26 at prescribed time intervals to measure the spectral reflectances of the coke 26. The prescribed time intervals may be determined according to, for example, the measurement area of the coke 26 measured by the spectrometer 16 and the conveyance speed of the conveyor 14. Specifically, the prescribed time intervals may be time intervals computed by dividing the length of the measurement area in the conveyance direction of the conveyor 14 by the conveyance speed of the conveyor 14. In this manner, the spectrometer 16 can perform the measurement on the coke 26 with no spatial intervals in the conveying direction of the conveyor 14. Preferably, the spectrometer 16 measures the spectral reflectances of the coke 26 from a direction perpendicular to the conveying direction of the conveyor 14.

In this example, the spectrometer 16 used is, for example, a spectrometer that can perform spectral analysis on the light reflected from the coke 26 at nine wavelengths. The nine wavelengths in the spectral analysis are obtained using a visible light color filter and an infrared narrow-band bandpass filter. The nine wavelengths arranged from the shortest wavelength are blue, green, red, 1.32 µm, 1.46 µm, 1.60 µm, 1.80 µm, 1.96 µm, and 2.10 µm. The blue means a wavelength of 435 to 480 nm. The green means a wavelength of 500 to 560 nm, and the red means a wavelength of 610 to 750 nm.

When the spectrometer 16 measures spectral reflectances at the nine wavelengths, the data concerning the spectral reflectances (hereinafter referred simply as the spectral reflectances) is outputted to the arithmetic unit 22 of the arithmetic device 20. Upon acquisition of the spectral reflectances from the spectrometer 16, the arithmetic unit 22 extracts, as feature quantities, the scores of principal components strongly correlated with, for example, a change in the fine ratio of the coke 26. The scores of the principal components strongly correlated with a change in the fine ratio of the coke 26 are scores strongly correlated with the change in the fine ratio of the coke 26 among the scores computed from the basis vectors of nine principal components obtained by principal component analysis performed on the spectral reflectances obtained from the spectrometer. The principal components strongly correlated with a change in the fine ratio of the coke 26 are an example of predetermined principal components.

In the following description, the feature quantities extracted by the arithmetic unit 22 are scores computed from the basis vectors of two principal components strongly correlated with a change in the fine ratio of the coke 26. However, this is not a limitation, and the feature quantities extracted by the arithmetic unit 22 may be one or three or more scores strongly correlated with a change in the fine ratio of the coke 26. When nine scores are used, all the spectral reflectances at the nine wavelengths are used. Therefore, the number of scores used is preferably 8 or less. In this manner, an influence of a factor less correlated with a change in the fine ratio can be excluded. Cross-validation may be combined with the principal component analysis. With this method, the minimum necessary number of scores that gives high accuracy on average irrespective of the sieve analysis data used is selected.

Arithmetic expressions for computing the scores of the two principal components strongly correlated with a change in the fine ratio of the coke 26 and a relational expression between the fine ratio and the scores are prestored in the storage unit 24. In this example, the relational expression between the fine ratio and the scores is, for example, formula (1) that is a regression formula with the fine ratio (Y) of the coke 26 as a response variable and the two scores as explanatory variables ($X_1$, $X_2$).

$$Y = b + a_1 \times X_1 + a_2 \times X_2 \qquad (1)$$

In formula (1) above, b, $a_1$, and $a_2$ are parameters of the regression formula.

The arithmetic expressions for computing the scores of the two principal components and formula (1) are computed in the following procedure. First, the spectrometer 16 is used to measure the spectral reflectances of the coke conveyed by the conveyor 14 at the nine wavelengths. The measured spectral reflectances at the nine wavelengths are subjected to principal component analysis to obtain nine basis vectors of first to ninth principal components and nine scores computed from the basis vectors.

Next, the coke whose spectral reflectances have been measured is collected and subjected to sieve analysis to actually measure the ratio of coke fines with a particle size of 1 mm or less. The fine ratio measured by the sieve analysis is computed as follows. The coke is dried at 120 to 200° C. for 4 hours or longer to constant weight and then sieved using a sieve with a mesh size of 1 mm. The fine ratio is computed as the ratio of the difference in the mass of the coke before and after sieving to the mass of the coke before sieving. This procedure is repeated for different types of coke with different fine ratios and different water contents to obtain a plurality of data sets. Each data set includes the nine scores and the fine ratio obtained by the sieve analysis. The nine scores for each type of coke are compared to those for other types of coke with different fine ratios in the plurality of data sets, and two scores strongly correlated with a change in the fine ratio of the coke are identified. The arithmetic expressions for computing the two identified scores can be computed using the basis vectors of the scores.

When the two principal components strongly correlated with a change in the fine ratio of the coke are identified, data sets each including the fine ratio and the two identified scores can be obtained from the plurality of data sets prepared for different types of coke with different fine ratios and different water contents and each including the nine scores and the fine ratio of coke. Therefore, the parameters b, $a_1$, and $a_2$ in formula (1) can be computed using the obtained data sets and the least squares method. In this manner, formula (1) that can compute the fine ratio of the coke 26 from the scores of the two principal components can be computed. The computed arithmetic expressions for computing the two scores and formula (1) are prestored in the storage unit 24.

Upon acquisition of the spectral reflectances at the nine wavelengths from the spectrometer 16, the arithmetic unit 22 reads the arithmetic expressions for computing the identified two scores strongly correlated with a change in the fine ratio of the coke from the storage unit 24 and computes the scores of the two principal components using the spectral reflectance at the nine wavelengths and the arithmetic expressions. After the computation of the scores of the two principal components, the arithmetic unit 22 reads formula (1) from the storage unit 24 and computes the fine ratio of the coke using the computed scores and formula (1). In this manner, the fine ratio measuring device 12 according to this example measures the fine ratio of the coke 26 conveyed by the conveyor 14 in real time.

Figure 2:
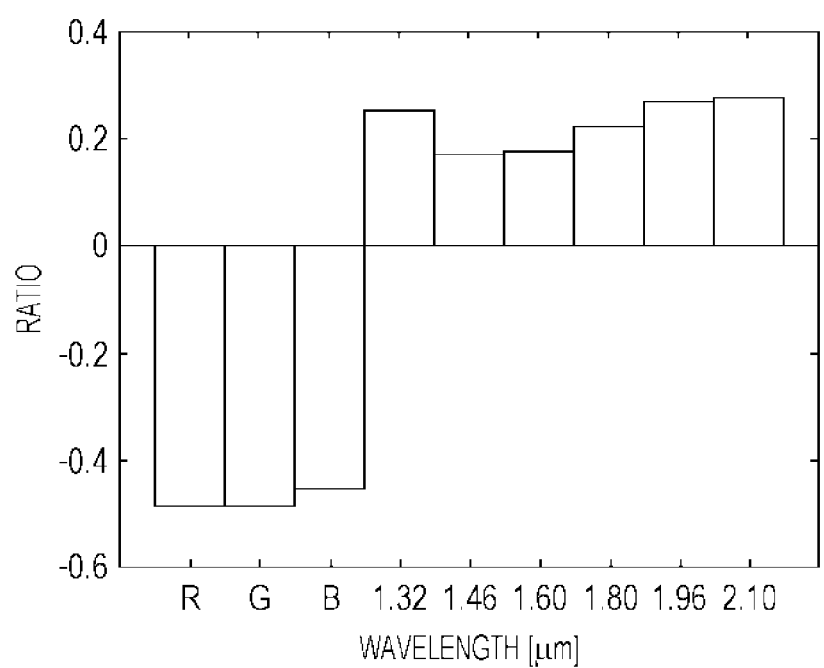
FIG. 2 is a graph showing ratios at different wavelengths in a score most strongly correlated with a change in the fine ratio of coke.
Figure 3:
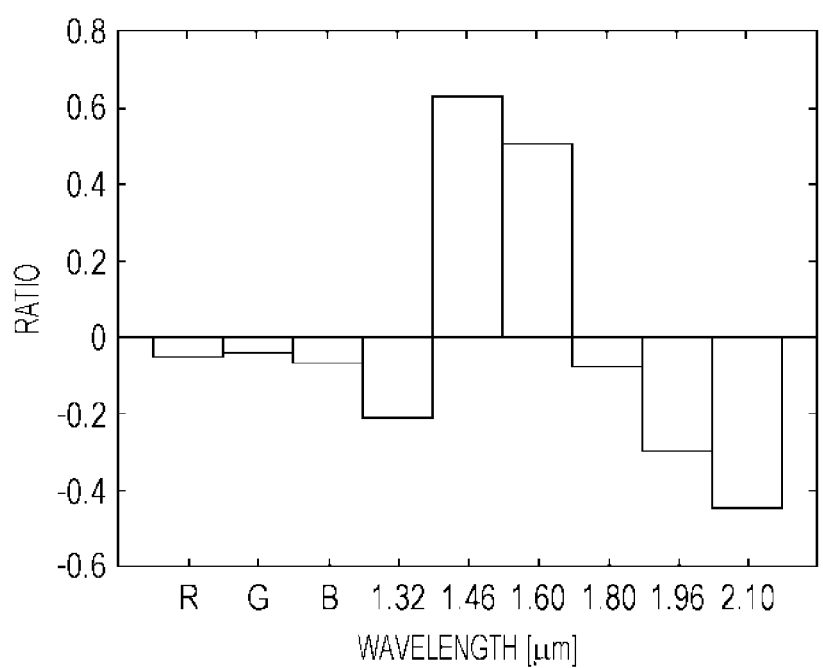
FIG. 3 is a graph showing ratios at different wavelengths in a score second most strongly correlated with a change in the fine ratio of the coke.

FIG. 2 is a graph showing ratios at different wavelengths in a score most strongly correlated with a change in the fine ratio of the coke. FIG. 3 is a graph showing ratios at different wavelengths in a score next strongly correlated with a change in the fine ratio of the coke. As can be seen from FIGS. 2 and 3, the score in which ratios are high only at wavelengths of 1.46 μm and 1.96 □m, which are absorption wavelengths of water, is not strongly correlated with a change in the fine ratio of the coke. These results show that, in the measurement of the fine ratio of the coke, the water content of the coke is not the only dominant factor. This shows that the accuracy of measurement of the fine ratio using the fine ratio measurement method of computing the fine ratio of coke using only the water content of the coke is low.

Figure 4:
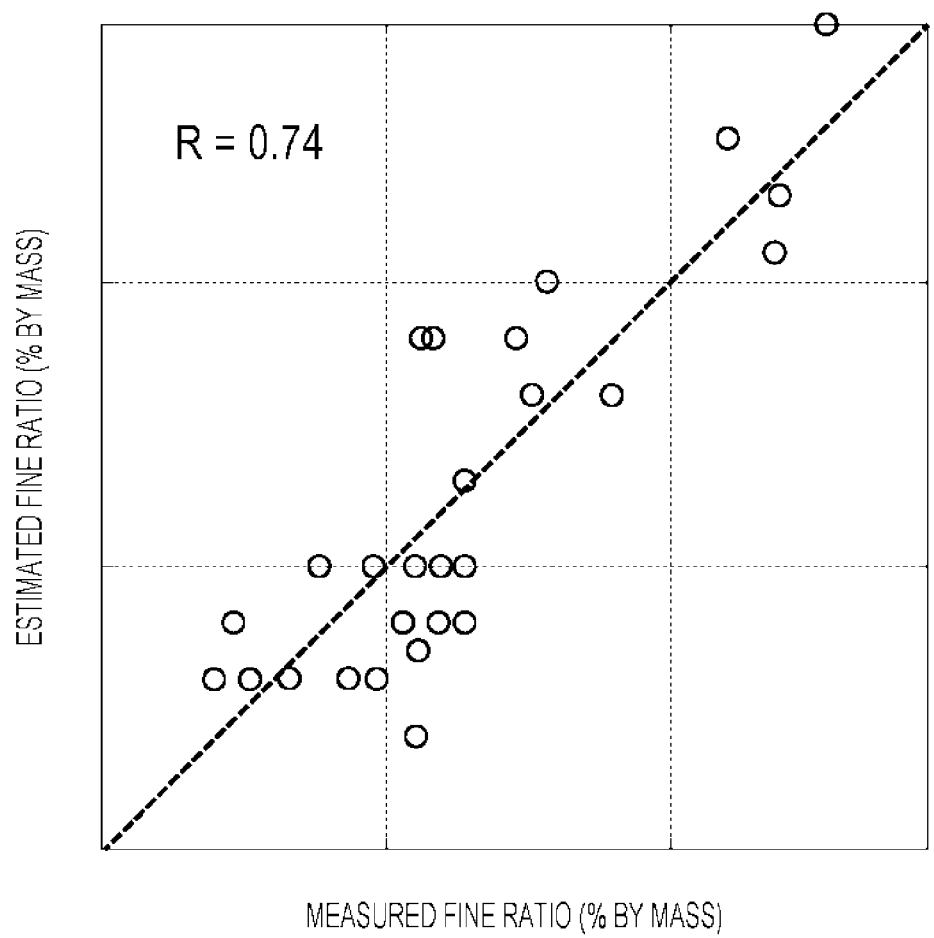
FIG. 4 is a graph showing the correlation between the measured fine ratio of coke and the estimated fine ratio of the coke.

FIG. 4 is a graph showing the correlation between the measured fine ratio of coke and the estimated fine ratio of the coke. In FIG. 4, the horizontal axis represents the measured fine ratio (% by mass), and the vertical axis represents the estimated fine ratio (% by mass). The measured fine ratio was computed as follows. Various types of coke were used, and each of them was dried at 120 to 200° C. for 4 hours or longer to constant weight and then sieved using a sieve with a mesh size of 1 mm. The fine ratio was computed as the ratio of the difference in the mass of the coke before and after sieving to the mass of the coke before sieving. The estimated fine ratio is a value computed using the measured values of the spectral reflectances at the nine wavelengths of coke whose fine ratio has been measured and the regression formula with the fine ratio of the coke as a response variable and the two scores (FIGS. 2 and 3) strongly correlated with the fine ratio of the coke and obtained using the principal component analysis as explanatory variables. As shown in FIG. 4, there is a strong correlation between the estimated fine ratio and measured fine ratio of the coke, and the correlation coefficient R is 0.74. As can be seen from these results, by computing the fine ratio of coke from the scores obtained by the principal component analysis, the fine ratio can be measured with high accuracy.

The fine ratio of the coke 26 conveyed by the conveyor 14 can be measured using the fine ratio measuring system including the fine ratio measuring device. In this example, when the measured fine ratio of the coke 26 is judged to be higher than a predetermined threshold value, the conveyance direction of the coke 26 may be reversed to re-sieve the coke 26 using the sieve with a mesh size of 35 mm. This allows the amount of coke fines charged into a blast furnace to be reduced. Therefore, deterioration of gas permeability in the blast furnace is prevented, and this can contribute to stabilization of operation of the blast furnace. The mesh size of 35 mm is an example of a mesh size larger than the particle size of coke fines and smaller than the particle size of lump coke.

In the example described above, two scores strongly correlated with a change in the fine ratio of coke are identified from the nine scores obtained by subjecting the spectral reflectances at the nine wavelengths to principal component analysis, but this is not a limitation. For example, the following method may be used. Different types of coke whose spectral reflectances at the nine wavelengths have been measured are subjected to sieve analysis to measure their fine ratio, and the partial least squares (PLS) method is applied to data sets each including the fine ratio and the spectral reflectances at the nine wavelengths to directly determine scores strongly correlated with the fine ratio of the coke.

In this example, arithmetic expressions for computing the scores strongly correlated with the fine ratio of the coke can be computed from the basis vectors of the scores determined by the PLS. The relational expression between the fine ratio and the scores is the same regression formula as formula (1). The parameters of the regression formula represented by formula (1) can be computed from the plurality of data sets each including the scores determined by the PLS and the fine ratio using the least squares method.

Upon acquisition of the spectral reflectance at the nine wavelengths from the spectrometer 16, the arithmetic unit 22 reads the arithmetic expressions for computing the two scores from the storage unit 24 and computes the two scores using the spectral reflectances at the nine wavelengths and the arithmetic expressions. After computation of the two scores, the arithmetic unit 22 reads formula (1) from the storage unit 24 and computes the fine ratio of the coke using the computed scores and formula (1). In this manner, the fine ratio measuring device 12 measures the fine ratio of the coke 26 conveyed by the conveyor 14 in real time.

Figure 5:
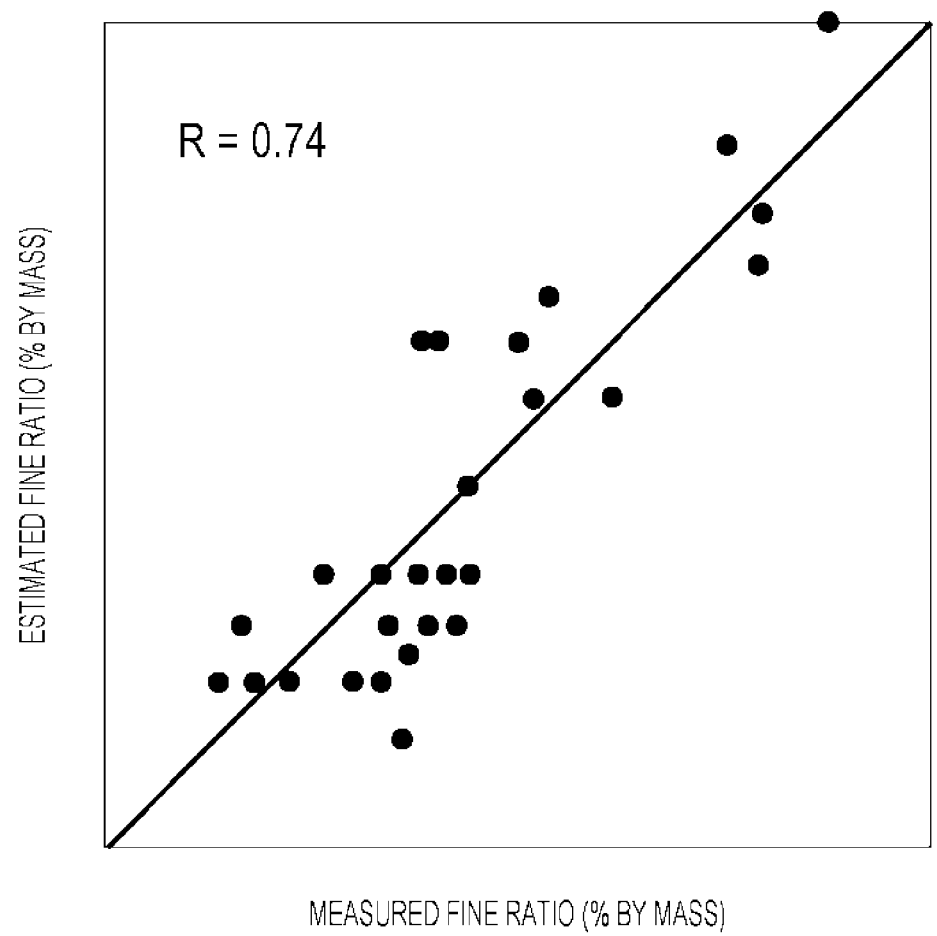
FIG. 5 is a graph showing the correlation between the measured fine ratio of the coke and the estimated fine ratio of the coke.

FIG. 5 is a graph showing the correlation between the measured fine ratio and estimated fine ratio of the coke. In FIG. 5, the horizontal axis represents the measured fine ratio (% by mass), and the vertical axis represents the estimated fine ratio (% by mass). The measured fine ratio was computed as follows. Various types of coke were used, and each of them was dried at 120 to 200° C. for 4 hours or longer to constant weight and then sieved using a sieve with a mesh size of 1 mm. The fine ratio was computed as the ratio of the difference in the mass of the coke before and after sieving to the mass of the coke before sieving. The estimated fine ratio is a value computed using the measured values of the spectral reflectances at the nine wavelengths of coke whose fine ratio has been measured and the regression formula with the fine ratio of the coke as a response variable and the two scores strongly correlated with the fine ratio of the coke and obtained using the PLS as explanatory variables. As shown in FIG. 5, there is a strong correlation between the estimated fine ratio and measured fine ratio of the coke. The correlation coefficient R is 0.74, and the dispersion σ is 0.17 (% by mass). As can be seen from these results, the fine ratio measuring device 12 can measure the fine ratio of coke with high accuracy.

Figure 6:
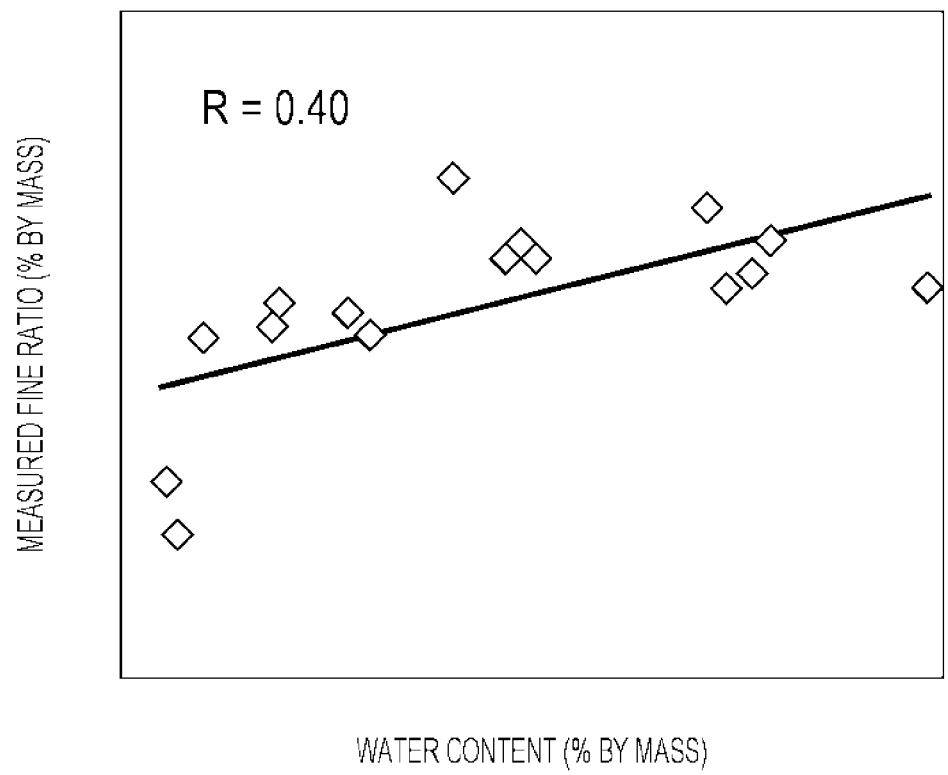
FIG. 6 is a graph showing the correlation between the water content of coke and the measured fine ratio of the coke.

FIG. 6 is a graph showing the correlation between the water content of coke and the measured fine ratio of the coke. In FIG. 6, the horizontal axis represents the water content (% by mass), and the vertical axis represents the measured fine ratio (% by mass). The water content was measured for various types of coke. The content of water contained in each type of coke was measured using a neutron moisture meter. The measured fine ratio was computed as follows. Each type of coke whose water content had been measured was dried at 120 to 200° C. for 4 hours or longer to constant weight and then sieved using a sieve with a mesh size of 1 mm. The fine ratio was computed as the ratio of the difference in the mass of the coke before and after sieving to the mass of the coke before sieving.

As shown in FIG. 6, there is a correlation between the fine ratio of the coke and the water content of the coke. However, the correlation coefficient R is 0.40, and the fine ratio of the coke is not strongly correlated with the water content of the coke. One of the causes may be that the water content of the coke includes the content of water present on the surface of the coke and the amount of water present inside the coke. Specifically, the water present on the surface of the coke may be strongly correlated with fines adhering to the surface of the coke, but the water present inside the coke has no influence on the coke fines adhering to the surface of the coke. It is inferred that the correlation between the water content of the coke and the fine ratio of the coke is weak due to the influence of the content of water present inside the coke.

In the fine ratio measuring device 12 according to this example, scores strongly correlated with the fine ratio of coke are extracted as feature quantities from the spectral reflectances of the coke, and the fine ratio of the coke is computed using the regression formula with the fine ratio of the coke as a response variable and the extracted scores as explanatory variables. As can be seen from FIGS. 5 and 6, the fine ratio of coke can be computed with higher accuracy when the fine ratio of the coke is computed using the fine ratio measuring device 12 than when the fine ratio of the coke is computed using the relation between the water content of the coke and the fine ratio of the coke.

We have shown the method of computing scores strongly correlated with the fine ratio of coke using the principal component analysis and the method of computing scores strongly correlated with the fine ratio of coke using the PLS. Using the PLS is advantageous in that the scores strongly correlated with the fine ratio of coke can be determined directly. However, when the PLS is used for when measurement data about the fine ratio of coke is available only for coke under specific conditions, the error in the measurement of the fine ratio under the conditions different from the specific conditions may increase due to overfitting to the specific conditions. Therefore, when measurement data about the fine ratio of coke under various conditions is available, it is preferable to use the PLS to determine scores strongly correlated with the fine ratio of the coke. When only measurement data about the fine ratio of coke under specific conditions is available, it is preferable to perform the principal component analysis to determine scores strongly correlated with the fine ratio of the coke.

In the fine ratio measuring device 12, the scores strongly correlate with a change in the fine ratio are used as feature quantities, but the example shown is not a limitation. For example, the arithmetic unit 22 may extract, as feature quantities, spectral reflectances at a plurality of wavelengths that are strongly correlated with a change in the fine ratio. An example in which spectral reflectances at n wavelengths that are strongly correlated with a change in the fine ratio are extracted as feature quantities will be described.

The spectrometer 16 measures the spectral reflectances of the coke 26 at m wavelengths and outputs the spectral reflectances to the arithmetic unit 22. m is a natural number equal to or more than n. Upon acquisition of the spectral reflectances from the spectrometer 16, the arithmetic unit 22 extracts, as feature quantities, spectral reflectances at n wavelengths that are strongly correlated with a change in the fine ratio of the coke. The spectral reflectances at the n wavelengths that are strongly correlated with a change in the fine ratio of the coke are an example of one or a plurality of predetermined wavelengths spectral reflectances.

A relational expression between the fine ratio and the n spectral reflectances are prestored in the storage unit 24. In this example, the relational expression between the fine ratio and the n spectral reflectances is formula (2) that is a regression formula with the fine ratio of the coke 26 (Y) as a response variable and the spectral reflectances at the n wavelengths strongly correlated with a change in the fine ratio of the coke as explanatory variables ($Z_1, Z_2, \ldots, Z_n$).

$$Y = d + c_1 \times Z_1 + c_2 \times Z_2 + \ldots + c_n \times Z_n \quad (2)$$

In formula (2), d, $c_1, c_2, \ldots, c_n$ are parameters of the regression formula.

Formula (2) is computed using the following procedure. First, the spectrometer 16 is used to measure the spectral reflectances of coke conveyed by the conveyor 14 at m wavelengths. The coke whose spectral reflectances have been measured is collected and subjected to sieve analysis to measure the ratio of coke fines with a particle size of 1 mm or less. The measured fine ratio is computed as follows. The coke whose spectral reflectances have been measured is dried at 120 to 200° C. for 4 hours or longer to constant weight and then sieved using a sieve with a mesh size of 1 mm. The fine ratio is computed as the ratio of the difference in the mass of the coke before and after sieving to the mass of the coke before sieving. This procedure is repeated for different types of coke with different fine ratios and different water contents to obtain a plurality of data sets. Each data set includes the fine ratio and the spectral reflectances at them wavelengths. The spectral reflectances at the m wavelengths of each type of coke are compared with those of other types of coke with different fine ratios in the plurality of data sets to identify wavelengths for n spectral reflectances strongly correlated with a change in the fine ratio of coke.

When the wavelengths for the n spectral reflectances are identified, a plurality of data sets each including the fine ratio and the spectral reflectances at the n wavelengths can be obtained from the plurality of data sets each including the fine ratio and the spectral reflectances at the m wavelengths, and the parameters d, $c_1, c_2, c_3, \ldots,$ cn in formula (2) can be computed using these data sets and the least squares method. In this manner, formula (2) that can compute the fine ratio of the coke from the spectral reflectances at the n wavelengths can be computed. The thus-computed formula (2) is prestored in the storage unit 24.

Upon acquisition of the spectral reflectances at the m wavelengths from the spectrometer 16, the arithmetic unit 22 extracts, as feature quantities, the spectral reflectances at the n wavelengths. When the spectral reflectances at the n wavelengths are extracted, the arithmetic unit 22 reads formula (2) from the storage unit 24 and computes the fine ratio of the coke. As described above, the arithmetic unit 22 may extracts, as feature quantities, the spectral reflectances at the n wavelengths that are strongly correlated with a change in the fine ratio of the coke, and the fine ratio of the coke 26 conveyed by the conveyor 14 can be measured in real time using these spectral reflectances.

The coke 26 is shown as an example of the material in the form of lumps, but this is not a limitation. Other examples of the raw material to be charged into the blast furnace are lump ore and sintered ore, and they may be used instead of the coke 26.

The invention claimed is:

1. A fine ratio measuring device that measures a ratio of fines adhering to the surface of a material in the form of lumps, the fine ratio measuring device comprising:
   an illumination unit that illuminates the material in the form of lumps;
   a spectrometer that performs spectral analysis on light reflected from the material in the form of lumps to measure spectral reflectance; and
   an arithmetic device that extracts at least one feature quantity more strongly correlated with a change in the fine ratio of the material than a change in a water content of the material, from the spectral reflectance measured by the spectrometer and computes the fine ratio from the extracted at least one feature quantity.

2. The fine ratio measuring device according to claim 1, wherein the at least one feature quantity is at least one score of at least one basis vector of at least one predetermined principal component obtained by subjecting spectral reflectances at a plurality of wavelengths to principal component analysis, the spectral reflectances being measured by the spectrometer,
   the arithmetic device includes an arithmetic unit and a storage unit,
   a relational expression between the fine ratio and the at least one score is prestored in the storage unit, and
   the arithmetic unit computes the at least one score from the spectral reflectances at the plurality of wavelengths and then computes the fine ratio using the computed at least one score and the relational expression.

3. A fine ratio measuring system comprising:
   the fine ratio measuring device according to claim 2; and
   a conveyor that conveys the material in the form of lumps,
   wherein the fine ratio measuring device is disposed above the conveyor and measures the ratio of fines adhering to the surface of the material in the form of lumps to be conveyed to a blast furnace by the conveyor.

4. A method of operating a blast furnace comprising:
   measuring, with the fine ratio measuring system according to claim 3, the ratio of the fines adhering to the surface of the material in the form of lumps to be conveyed to the blast furnace by the conveyor; and
   judging whether or not the measured fine ratio is higher than a predetermined threshold value,
   wherein, when the fine ratio is judged to be higher than the predetermined threshold value in the step of judging, the material in the form of lumps is sieved using a sieve having a mesh size larger than the particle size of the fines and smaller than the particle size of the material in the form of lumps.

5. The fine ratio measuring device according to claim 1, wherein the at least one feature quantity is at least one score of at least one basis vector obtained by applying PLS to spectral reflectances at a plurality of wavelengths, the spectral reflectances being measured by the spectrometer,
   the arithmetic device includes an arithmetic unit and a storage unit,
   a relational expression between the fine ratio and the at least one score is prestored in the storage unit, and
   the arithmetic unit computes the at least one score from the spectral reflectances at the plurality of wavelengths and then computes the fine ratio using the computed at least one score and the relational expression.

6. A fine ratio measuring system comprising:
   the fine ratio measuring device according to claim 5; and
   a conveyor that conveys the material in the form of lumps,
   wherein the fine ratio measuring device is disposed above the conveyor and measures the ratio of fines adhering to the surface of the material in the form of lumps to be conveyed to a blast furnace by the conveyor.

7. A method of operating a blast furnace comprising:
   measuring, with the fine ratio measuring system according to claim 6, the ratio of the fines adhering to the surface of the material in the form of lumps to be conveyed to the blast furnace by the conveyor; and
   judging whether or not the measured fine ratio is higher than a predetermined threshold value,
   wherein, when the fine ratio is judged to be higher than the predetermined threshold value in the step of judging, the material in the form of lumps is sieved using a sieve having a mesh size larger than the particle size of the fines and smaller than the particle size of the material in the form of lumps.

8. The fine ratio measuring device according to claim 1, wherein the at least one feature quantity is at least one spectral reflectance at the at least one predetermined wavelength, the at least one spectral reflectance being measured by the spectrometer,
   the arithmetic device includes an arithmetic unit and a storage unit,
   a relational expression between the fine ratio and the at least one spectral reflectance at the at least one wavelength is prestored in the storage unit, and
   the arithmetic unit computes the fine ratio using the at least one spectral reflectance at the at least one wavelength and the relational expression.

9. A fine ratio measuring system comprising:
   the fine ratio measuring device according to claim 8; and
   a conveyor that conveys the material in the form of lumps,
   wherein the fine ratio measuring device is disposed above the conveyor and measures the ratio of fines adhering to the surface of the material in the form of lumps to be conveyed to a blast furnace by the conveyor.

10. A method of operating a blast furnace comprising:
    measuring, with the fine ratio measuring system according to claim 9, the ratio of the fines adhering to the surface of the material in the form of lumps to be conveyed to the blast furnace by the conveyor; and
    judging whether or not the measured fine ratio is higher than a predetermined threshold value,
    wherein, when the fine ratio is judged to be higher than the predetermined threshold value in the step of judging, the material in the form of lumps is sieved using a sieve having a mesh size larger than the particle size of the fines and smaller than the particle size of the material in the form of lumps.

11. A fine ratio measuring system comprising:
    the fine ratio measuring device according to claim 1; and
    a conveyor that conveys the material in the form of lumps, wherein the fine ratio measuring device is disposed above the conveyor and measures the ratio of fines adhering to the surface of the material in the form of lumps to be conveyed to a blast furnace by the conveyor.

12. A method of operating a blast furnace comprising:
measuring, with the fine ratio measuring system according to claim 11, the ratio of the fines adhering to the surface of the material in the form of lumps to be conveyed to the blast furnace by the conveyor; and
judging whether or not the measured fine ratio is higher than a predetermined threshold value,
wherein, when the fine ratio is judged to be higher than the predetermined threshold value in the step of judging, the material in the form of lumps is sieved using a sieve having a mesh size larger than the particle size of the fines and smaller than the particle size of the material in the form of lumps.

13. A method of measuring a ratio of fines adhering to a surface of a material in the form of lumps, the method comprising:
an illumination step that illuminates the material in the form of lumps;
a measuring step that performs spectral analysis on light reflected from the material in the form of lumps to measure spectral reflectance; and
an arithmetic step that extracts at least one feature quantity more strongly correlated with a change in the fine ratio of the material than a change in a water content of the material, from the spectral reflectance measured by the measuring step and computes the fine ratio from the extracted at least one feature quantity.

* * * * *